United States Patent
Smuk et al.

(10) Patent No.: US 7,440,697 B1
(45) Date of Patent: Oct. 21, 2008

(54) DATA BUS FOR A PLURALITY OF NODES

(75) Inventors: Karel Smuk, Schweitenkirchen (DE); Robert Griessbach, Wayarn (DE); Martin Peller, Munich (DE); Josef Berwanger, Poing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/623,895

(22) PCT Filed: Feb. 23, 1999

(86) PCT No.: PCT/EP99/01166

§ 371 (c)(1),
(2), (4) Date: Nov. 16, 2000

(87) PCT Pub. No.: WO99/46895

PCT Pub. Date: Sep. 16, 1999

(30) Foreign Application Priority Data

Mar. 10, 1998 (DE) .............................. 198 10 292

(51) Int. Cl.
*H04B 10/20* (2006.01)
(52) U.S. Cl. .............................. 398/60; 398/61; 398/66
(58) Field of Classification Search ............ 398/24–27, 398/33, 36–140, 158–159, 175, 202–204, 398/177
See application file for complete search history.

(56) References Cited

U.S. PATENT DOCUMENTS

| | | | |
|---|---|---|---|
| 4,561,091 A | 12/1985 | Scholl et al. | |
| 4,644,587 A * | 2/1987 | Takahashi et al. | 398/62 |
| 4,731,880 A * | 3/1988 | Ault et al. | 398/61 |
| 4,761,799 A | 8/1988 | Arragon | |
| 4,785,394 A | 11/1988 | Fischer | |
| 5,073,982 A | 12/1991 | Viola et al. | |
| 5,161,153 A | 11/1992 | Westmore | |
| 5,272,558 A * | 12/1993 | Canestri et al. | 398/177 |
| 5,418,785 A * | 5/1995 | Olshansky et al. | 370/438 |
| 5,541,759 A * | 7/1996 | Neff et al. | 398/139 |
| 5,585,954 A * | 12/1996 | Taga et al. | 398/26 |
| 5,617,238 A * | 4/1997 | Bogdan et al. | 398/182 |
| 5,684,831 A | 11/1997 | Moller | |
| 5,859,716 A * | 1/1999 | O'Sullivan et al. | 398/17 |
| 5,900,621 A * | 5/1999 | Nagakubo et al. | 250/205 |

(Continued)

FOREIGN PATENT DOCUMENTS

DE 3244851 6/1983

(Continued)

OTHER PUBLICATIONS

H. Tominaga et al., "A Network Architecture With Distributed Switching Function for Optical Fiber Links" Proceedings Computer Networks Compcon 82, Sep. 20-23, 1982, pp. 478-483.

*Primary Examiner*—Dzung D Tran
(74) *Attorney, Agent, or Firm*—Crowell & Moring LLP

(57) ABSTRACT

An apparatus and method for detecting optical defects in optical bus systems which use optical modules in communication with a plurality of nodes connected to each other. Deterioration of the optical transmission quality is detected as a resulting deterioration in an electrical output signal and noted deterioration is stored and read out.

7 Claims, 1 Drawing Sheet

U.S. PATENT DOCUMENTS

| | | | |
|---|---|---|---|
| 6,025,946 A * | 2/2000 | Miyamori et al. | 398/185 |
| 6,072,609 A * | 6/2000 | Masuda | 398/27 |
| 6,178,025 B1 * | 1/2001 | Hardcastle et al. | 398/17 |
| 6,259,704 B1 * | 7/2001 | Asahina et al. | 370/460 |

FOREIGN PATENT DOCUMENTS

| | | |
|---|---|---|
| DE | 3305115 | 8/1983 |
| DE | 3420814 | 12/1985 |
| DE | 3503364 | 8/1986 |
| DE | 3613183 | 10/1987 |
| DE | 4010574 | 1/1991 |
| DE | 4008729 | 9/1991 |
| DE | 4022027 | 1/1992 |
| DE | 4139300 | 6/1993 |
| DE | 4224339 | 1/1994 |
| DE | 19626287 | 2/1997 |
| DE | 19720401 | 3/1998 |
| EP | 0255442 | 2/1988 |
| EP | 0225025 | 1/1993 |
| EP | 0292072 | 2/1993 |
| EP | 0412220 | 3/1994 |
| EP | 0439646 | 3/1995 |
| EP | 0698980 | 2/1996 |
| WO | WO-8503826 A1 | 8/1985 |
| WO | WO-9009710 A1 | 8/1990 |
| WO | WO-9106447 A1 | 5/1991 |
| WO | WO-9616490 A1 | 5/1996 |

* cited by examiner

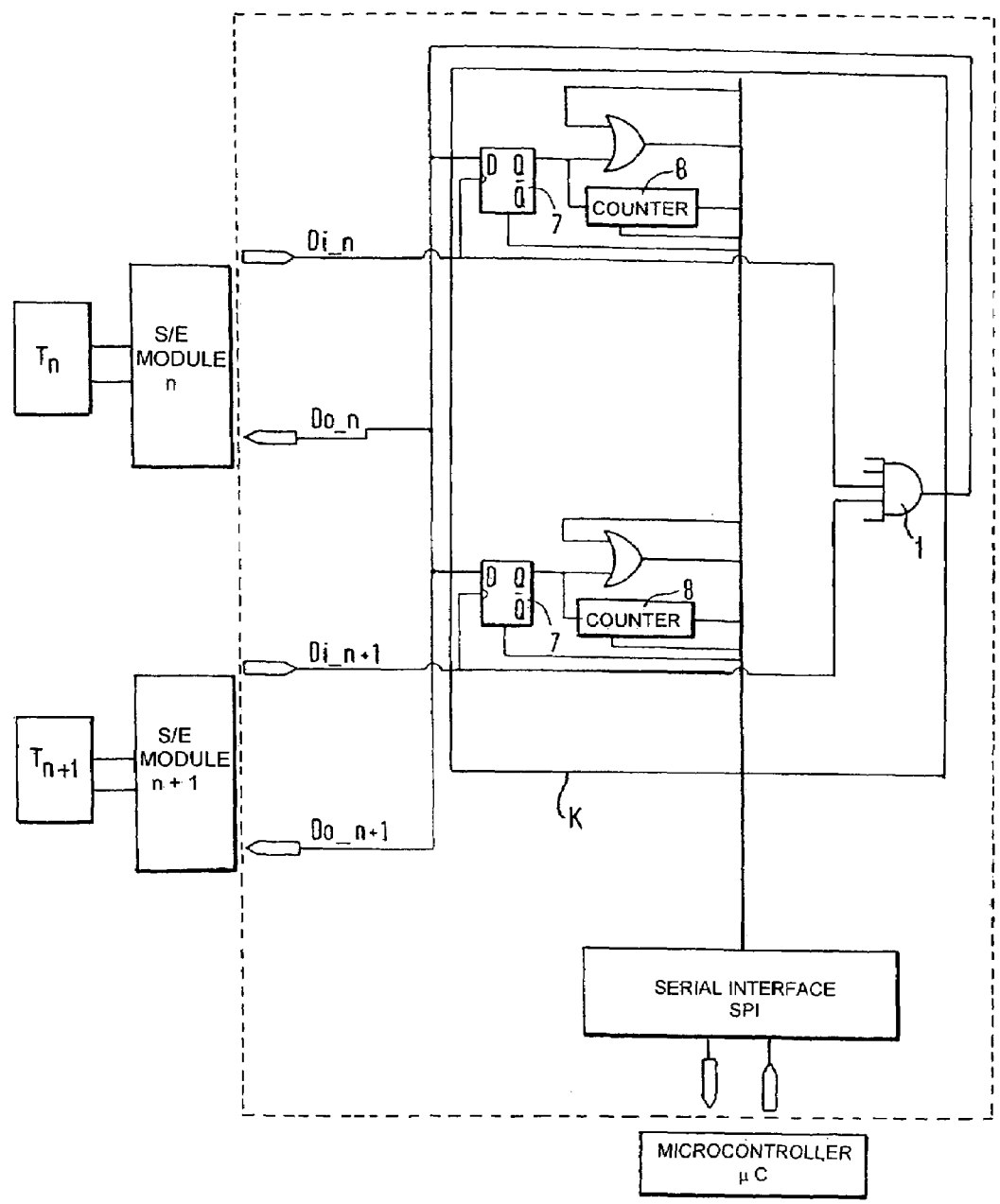

DATA BUS FOR A PLURALITY OF NODES

BACKGROUND AND SUMMARY OF THE INVENTION

This application claims the priority of Germany Patent Document 198 10 292.5, filed Mar. 10, 1998 and PCT/EP99/0116, filed Feb. 23, 1999, the disclosures of which are expressly incorporated by reference herein.

The invention relates to a data bus for a plurality of nodes that are connected to one another via a star coupler. Such a data bus is known from the unpublished German patent application 19720401 and a corresponding U.S. Pat. No. 6,587,474. Herein, the nodes are connected to the data bus via transmitter/sender modules. For optical bus systems, aging of the transmitter diodes or frequent reverse bending fatigue of the optical fiber or damage thereto can lead to a reduction of luminous power to the receiver diode, thereby resulting in malfunctions in the bus traffic. Such an error cannot be automatically detected and diagnosed.

The object of the invention is to provide a data bus of the aforementioned art that detects any degradation of transmission quality.

Degradation of the optical transmission quality can be detected by the transmitter/receiver module. This degradation is characterized, for example, by excessive attenuation or by the difference between dark current and photocurrent (useful current).

According to an advantageous development of the invention, the frequency of faulty data transmission can be determined.

In another advantageous development of the invention, addressability of the memory element allows the simple detection of which of the node(s) caused a faulty data transmission. As an example, the status of the memory element can be read out by a microcontroller assigned to the star coupler, via a serial interface (SPI, for example).

Subsequently, the memory element, for example, after a faulty transmission or after readout by the microcontroller, can be reset. Thus, the subsequently occurring faulty data transmission can be detected and distinguished from the preceding error.

Other objects, advantages and novel features of the present invention will become apparent from the following detailed description of the invention when considered in conjunction with the accompanying drawings.

BRIEF DESCRIPTION OF THE DRAWINGS

The invention is illustrated by the single FIGURE which shows detail representation of a data bus according to the invention whereby the mode of transmission of the nodes is monitored.

DETAILED DESCRIPTION OF THE PREFERRED EMBODIMENTS

Two nodes $T_n$ and $T_{n+1}$ are connected via S/E (transmit/receive) modules $S/E_n$ and $S/E_{n+1}$. The $S/E_n$ and $S/E_{n+1}$ modules convert optical messages in electric form received from said $T_n$ and $T_{n+1}$ nodes and relay the signals $Di_n$, $Di_{n+1}$ as input signals to a logical decision gate (AND Gate 1) as the central component of a star coupler K. The number of inputs and outputs of AND Gate 1 corresponds to the number of bus nodes. The output of AND Gate drives all inputs ($Do_n$, $Do_{n+1}$) of the $S/E_n$ and $S/E_{n+1}$ modules. The modules convert these electrical signals into optical signals for transmission to the $T_n$ and $T_{n+1}$ nodes via optical transmission segments.

Degradation of the optical transmission quality due to excessive attenuation or difference between dark current and photocurrent, can be detected by the transmit/receive module $S/E_n$ or $S/E_{n+1}$. During a low level at the optical data input of the module, a detected error is reported at the data output of the star coupler via a brief low impulse as an additional input signal Di_n, Di_n+1.

This error state is stored at each input of the star coupler in a buffer (7). A counter is assigned to each signal input. The counter 8 is, within the time of a transmission, incremented by one if an error is reported by the corresponding S/E module. The counters can be read out and reset via a serial interface (SPI, for example) of a microcontroller. With this function, the optical transmission paths of all bus nodes can be diagnosed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communication arrangement for connecting together a plurality of nodes, said arrangement comprising:
   at least one opto-electronic S/E transducer each connected to one of said plurality of nodes, each transducer generating a first electrical output signal in response to an optical input signal from one of said nodes, said each transducer determining a value of said first electrical output signal and outputting, during a period of time when there is an absence of an input optical signal from said one node, a second electrical signal as an error signal incrementing a counter assigned to the first electrical output signal to determine an error frequency when said value of said first electrical signal is less than a predetermined value.

2. The communication arrangement according to claim 1, further comprising a memory element for subsequent determination of a frequency of faulty data transmission.

3. A method for determining errors in data transmission among a plurality of nodes connected to one another, said method comprising the steps of:
   providing at least one optical module for converting an input optical signal from one of said nodes to an output electrical signal;
   determining a value of said output electrical signal;
   comparing said value to a base value; and
   outputting, during a time when there is an absence of input optical signals, an error signal when said value is less than said base value, the error signal incrementing a counter assigned to the output electrical signal to determine an error frequency.

4. The method according to claim 3,
   wherein said error signal is stored in a memory element for subsequent determination of a frequency of faulty data transmission.

5. The method according to claim 4, including the step of reading out a status of said memory element.

6. The method according to claim 4, wherein said memory element is addressable.

7. The method according to claim 4, wherein the memory element is resettable after at least one of the determination of the faulty transmission and a readout by a microcomputer.

* * * * *